(12) United States Patent
Ishioka et al.

(10) Patent No.: US 9,994,063 B2
(45) Date of Patent: Jun. 12, 2018

(54) BOOKLET HAVING ANTI-COUNTERFEITING FUNCTION, AND METHOD FOR MANUFACTURING THE SAME

(71) Applicant: TOPPAN PRINTING CO., LTD., Tokyo (JP)

(72) Inventors: Chiaki Ishioka, Tokyo (JP); Yoshiyuki Mizuguchi, Asaka (JP); Yoshiaki Hashimoto, Yokohama (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 97 days.

(21) Appl. No.: 13/796,090

(22) Filed: Mar. 12, 2013

(65) Prior Publication Data
US 2013/0257032 A1    Oct. 3, 2013

Related U.S. Application Data

(63) Continuation of application No. PCT/JP2011/071986, filed on Sep. 27, 2011.

(30) Foreign Application Priority Data

Sep. 28, 2010 (JP) .................................. 2010-216715

(51) Int. Cl.
*B42D 15/00* (2006.01)
*B42D 15/10* (2006.01)
(Continued)

(52) U.S. Cl.
CPC .............. *B42D 25/45* (2014.10); *B42D 1/00* (2013.01); *B42D 25/00* (2014.10); *B42D 25/24* (2014.10);
(Continued)

(58) Field of Classification Search
CPC .......... B42D 15/00; B42D 15/10; B42D 1/00; B42D 25/24; B42D 25/36; B42D 25/364;
(Continued)

(56) References Cited

U.S. PATENT DOCUMENTS 4,143,889 A * 3/1979 Scharlin .................. B42C 19/00
281/15.1
5,603,529 A * 2/1997 Breindel .......................... 283/56
(Continued)

FOREIGN PATENT DOCUMENTS

CA    2091109 A1 *  9/1994 ............. B42D 25/29
FR    2 918 311          1/2009
(Continued)

OTHER PUBLICATIONS

International Search Report of Corresponding PCT Application PCT/JP2011/071986 dated Nov. 29, 2011.
(Continued)

*Primary Examiner* — Justin V Lewis

(57) ABSTRACT

A booklet includes a sheet-like first substrate, and a sheet-like second substrate that is attached to the first substrate. The first substrate includes a light-transmitting region, and an optical functional unit is provided to the light-transmitting region. A latent image is provided to a surface of the second substrate that is opposite to the first substrate at a position corresponding to the optical functional unit. The latent image manifests when the optical functional unit operates by overlapping the first substrate with the second substrate.

6 Claims, 10 Drawing Sheets

(51) Int. Cl.
  *G09C 3/00* (2006.01)
  *B42D 25/45* (2014.01)
  *G06K 19/067* (2006.01)
  *G02B 5/30* (2006.01)
  *B42D 1/00* (2006.01)
  *B42D 25/00* (2014.01)
  *B42D 25/305* (2014.01)
  *B42D 25/36* (2014.01)
  *B42D 25/351* (2014.01)
  *B42D 25/364* (2014.01)
  *B42D 25/24* (2014.01)
  *G06K 19/07* (2006.01)

(52) U.S. Cl.
  CPC ......... *B42D 25/305* (2014.10); *B42D 25/351* (2014.10); *B42D 25/36* (2014.10); *B42D 25/364* (2014.10); *G02B 5/3025* (2013.01); *G02B 5/3083* (2013.01); *G06K 19/067* (2013.01); *G06K 19/0723* (2013.01)

(58) Field of Classification Search
  CPC .... B42D 25/351; B42D 25/305; B42D 25/00; G09C 3/00; G06K 19/0723; G02B 5/3083; G02B 5/3025
  USPC ........ 283/67, 70, 72, 74, 75, 77, 87, 90, 94, 283/98, 99, 109, 901
  See application file for complete search history.

(56) References Cited

U.S. PATENT DOCUMENTS

| | | | |
|---|---|---|---|
| 5,826,914 A * | 10/1998 | Hudetz | B42D 1/007 283/61 |
| 6,770,898 B1 | 8/2004 | Wilson et al. | |
| 7,377,443 B2 | 5/2008 | Lasch et al. | |
| 2003/0015866 A1* | 1/2003 | Cioffi | B42D 15/085 283/72 |
| 2003/0169468 A1 | 9/2003 | Menz et al. | |
| 2004/0245765 A1 | 12/2004 | Taylor et al. | |
| 2005/0023819 A1* | 2/2005 | Wilen | 281/15.1 |
| 2006/0290136 A1* | 12/2006 | Alasia | G07D 7/128 283/72 |
| 2007/0182154 A1* | 8/2007 | Hoeppner | G06K 19/025 283/72 |
| 2008/0067801 A1 | 3/2008 | Schilling et al. | |
| 2010/0207377 A1* | 8/2010 | Camus | D21H 21/40 283/72 |
| 2010/0295290 A1* | 11/2010 | Muth | B32B 27/06 283/109 |

FOREIGN PATENT DOCUMENTS

| | | |
|---|---|---|
| JP | 2001-232978 | 8/2001 |
| JP | 2001-305078 | 10/2001 |
| JP | 2005-88569 | 4/2005 |
| JP | 2006-212838 | 8/2006 |
| JP | 2007-1181 | 1/2007 |
| JP | 2011-134048 | 7/2011 |

OTHER PUBLICATIONS

Passport Leaflet, <http://www.mofa.go.jp/mofajp/toko/passport/pdfs/ic_leaflet.pdf>, pp. 1-3.
Extended European Search Report dated Sep. 2, 2015 in corresponding European Patent Application No. 11829080.8.

* cited by examiner

BOOKLET HAVING ANTI-COUNTERFEITING FUNCTION, AND METHOD FOR MANUFACTURING THE SAME

CROSS-REFERENCE TO RELATED APPLICATIONS

This application is a continuation application of PCT Patent Application No. PCT/JP2011/071986, filed Sep. 27, 2011, which claims foreign priority benefit and is based upon Japanese Patent Application No. 2010-216715 filed Sep. 28, 2010, the disclosures of all of which are hereby incorporated by reference.

BACKGROUND

1. Field

Embodiments of the present invention relate to a booklet, particularly a booklet having an anti-counterfeiting function, and more particularly, to a kind of booklet such as a passport in which a high security function is necessary.

2. Description of the Related Art

As shown in FIG. 11, in a medium such as a passport and a bankbook, a plurality of sheets 81 and 82 overlap each other, and center portions thereof are saddle-stitched with an iron wire or a thread 83, whereby a booklet shape is obtained. Particularly, in a kind of booklet such as a passport in which high security for anti-counterfeiting is required, a binding thread 83 (anti-counterfeiting binding thread), which is treated with a fluorescent dye and thus emits light with an ultraviolet light source, is used for anti-counterfeiting (Japanese Unexamined Patent Application, First Publication No. 2001-305078).

On the other hand, in recent years, a booklet has been developed in which an IC chip storing individual information or the like as digital data is buried so as to realize reading-out or writing-in with respect to the IC chip with a reader or writer. Particularly, in an electronic passport field, such a booklet has been adopted in various countries. As for burying an IC chip in a booklet, a type in which an IC chip is attached to a booklet cover, and a type in which an inlet including an IC chip is interposed between pages and both pages are adhered to each other have been proposed (Japanese Unexamined Patent Application, First Publication No. 2005-88569).

In the type in which the inlet including the IC chip is interposed between pages, particularly, in the case of saddle-stitching, an innermost sheet at which the saddle-stitching thread is exposed is folded in half with the saddle-stitching thread made as a center, and the inlet is interposed in the innermost sheet. In this type, a uniform load is applied to both pages, and thus this type is preferable from viewpoints of a manufacturing process and strength. This type has been adopted as a passport of several countries including Japan (http://www.mofa.go.jp/mofaj/toko/passport/pdfs/ic_leaflet.pdf).

It is necessary to record individual face image information in the IC chip on the basis of International Civil Aviation Organization (ICAO) standard that defines specifications of the electronic passport. Furthermore, when face image information recorded in the IC chip and a face image recorded on a sheet of the passport in a photograph type or the like are compared with each other, the electronic information and the visual recognition information are mutually confirmed, and thus anti-counterfeiting and security are improved.

However, rewriting of the information recorded in the IC chip or replacement of the IC chip itself may occur. Furthermore, the passport may be counterfeited by re-covering the face photograph on the sheet of the passport. Therefore, improvement of security such as prevention of rewriting of the IC chip, and improvement in a technology of preventing counterfeiting of the visual recognition information are preferable.

As a technology of preventing the counterfeiting of the visual recognition information, Japanese Unexamined Patent Application, First Publication No. 2001-232978 discloses a passport in which the visual information such as the face image is buried in a sheet as a latent image and this visual information is viewed using a polarization film so as to verify the visual information such as the face image. According to a method of Japanese Unexamined Patent Application, First Publication No. 2001-232978, compared to the face photograph, it is difficult to counterfeit the face image due to the latent image, and thus security is improved. However, in the method of Japanese Unexamined Patent Application, First Publication No. 2001-232978, a verifying mechanism including a separate polarization film is also necessary.

In consideration of the above problems in the related art, an object of embodiments of the present invention is to provide a booklet in which security is improved by providing a latent image for anti-counterfeiting and self-verification of the latent image for anti-counterfeiting is possible in a yet easier manner.

SUMMARY

According to an aspect of the present invention, a booklet is provided including at least a sheet-like first substrate (such as a sheet-like saddle-stitch substrate); and a sheet-like second substrate (such as a sheet-like saddle-stitch substrate) that is attached to the first saddle-stitch substrate. The first substrate includes a light-transmitting region, and an optical functional unit is provided to the light-transmitting region. In the second substrate, a latent image is provided to a surface of the second substrate that is opposite to the first substrate at a position corresponding to the optical functional unit. The latent image manifests when the optical functional unit operates by overlapping the first substrate with the second substrate The first saddle-stitch substrate may be folded in half along a folding line defining two portions, and the two portions are adhered to each other.

An inlet may be interposed in the adhered portions of the first substrate. The inlet includes an IC chip and an antenna.

The first substrate and a substrate of the inlet may be each composed of thermoplastic.

The optical functional unit may have a polarization or phase modulation function.

The optical functional unit may include a polarization film or a phase difference film that is interposed in the adhered portions of the first substrate.

A part of the first substrate may be configured by a polarization film or a phase difference film.

The latent image may be formed in the second substrate in a continuous manner across a folding line where the second substrate is attached to the first substrate.

According to another aspect of the present invention, a method of manufacturing a booklet is provided. The method includes: saddle-stitching a first saddle-stitch substrate, which includes a light-transmitting region and is provided with an optical functional unit having a polarization or phase modulation action at the light-transmitting region, on to a second saddle-stitch substrate that is provided with a latent image manifested by allowing the optical functional unit to operate on a surface opposite to the first saddle-stitch substrate at a position corresponding to the optical functional unit; and folding the first saddle-stitch substrate in half along a center line and adhering the folded portions to each other.

According to the booklet related to the one aspect of the present invention, since the optical functional layer is provided to the first saddle-stitch substrate (light-transmitting film), and the latent image, which may be manifested by allowing the optical functional layer be to be operated, is provided to the substrate (the second saddle-stitch substrate) that adjoins the light-transmitting film and is saddle-stitched thereto at a position opposite to the optical functional layer, a booklet provided with anti-counterfeiting means that is capable of easily performing self-verification may be formed. Therefore, a booklet that is easily manufactured and has high security may be formed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DESCRIPTION OF EMBODIMENTS

Figure 1:
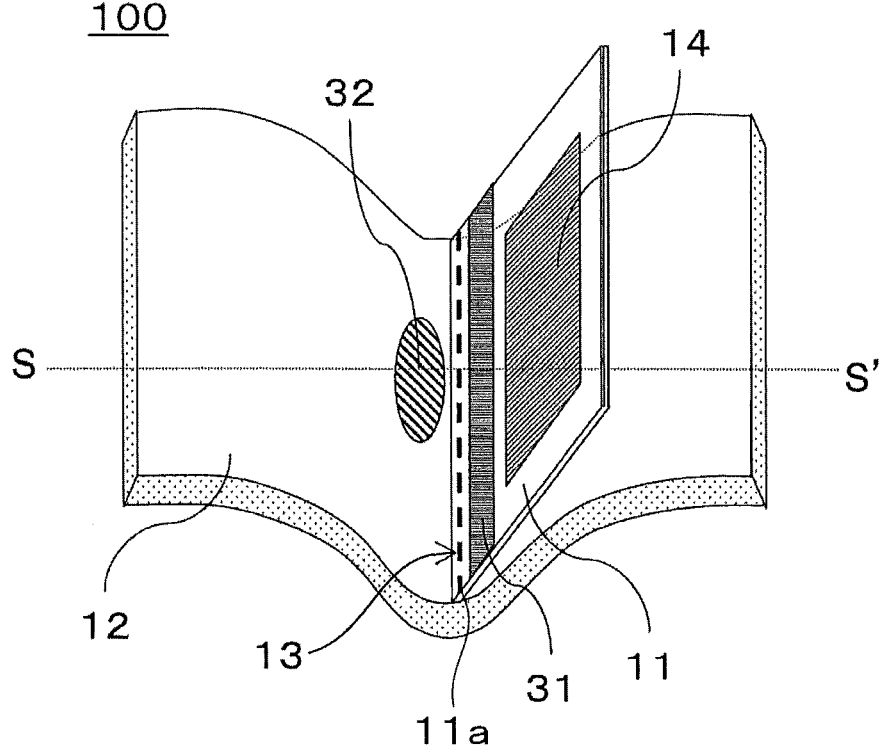
FIG. 1 is a schematic diagram illustrating a booklet related to an embodiment of the present invention.
Figure 2:
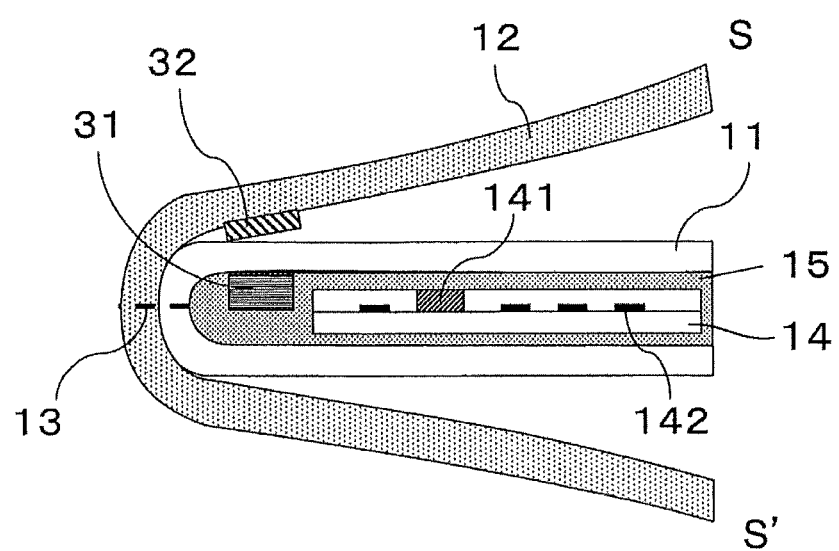
FIG. 2 is a schematic cross-sectional diagram illustrating the booklet related to the embodiment.

FIG. 1 shows a schematic diagram illustrating a booklet related to an embodiment of the present invention. FIG. 2 shows a schematic cross-sectional diagram illustrating a cross-section (S-S') that is orthogonal to a main surface of a first saddle-stitch substrate (light-transmitting substrate) 11 of the booklet described in FIG. 1.

In a booklet 100 related to FIGS. 1 and 2, at least a sheet-like first saddle-stitch substrate 11 is saddle-stitched onto a second saddle-stitch substrate 12 with a binding member 13 (binding means). The first saddle-stitch substrate 11 is folded in half along a folding line (or the like), shown here as a center line, that is stitched with the binding member 13 and the folded portions are bonded or adhered to each other.

An optical functional unit 31 having a polarization function, a phase modulation function, or a polarization and phase modulation function is provided at a predetermined number of places on the first saddle-stitch substrate 11. The first saddle-stitch substrate 11 has a light-transmitting property at a part of the places at which at least the optical functional unit 31 is provided.

The second saddle-stitch substrate 12, which adjoins the bonded first saddle-stitch substrate 11 and is saddle-stitched therewith, is provided with a latent image 32 at a position opposite to the optical functional unit 31. The latent image 32 is manifested by causing the optical functional unit 31 to operate.

Due to the optical functional unit 31 and the latent image 32, when the first saddle-stitch substrate 11 (light-transmitting film) overlaps two facing pages of the second saddle-stitch substrate 12 on a side at which the latent image 32 is formed, an image pattern appears at a latent image region, whereby an anti-counterfeiting function (anti-counterfeiting means) is realized.

Furthermore, an inlet 14 may be interposed between two facing pages of the first saddle-stitch substrate 11. The inlet 14 is provided with an IC chip 141 and an antenna 142 that enables IC chip 141 to communicate in a non-contact manner.

The saddle-stitching related to each embodiment of the present invention represents that an approximately center line portion of a sheet-like substrate is bonded or attached to another substrate with binding means. Therefore, at a stage before adhering the first saddle-stitch substrate 11 to each other, the first saddle-stitch substrate makes up two facing pages by a line segment (binding portion 11a) that connects bound portions.

According to a configuration related to the embodiment of the present invention, even in a state in which the first saddle-stitch substrate 11 is saddle-stitched and is attached as a booklet body, since the first saddle-stitch substrate 11 has a light-transmitting property in a region corresponding to the anti-counterfeiting means (latent image 32), the anti-counterfeiting means may be verified by visual recognition. The booklet body related to this embodiment of the present invention may make up a booklet related to this embodiment of the present invention alone or in combination with a component of a general kind of booklet such as a cover.

In the embodiment of the present invention, the booklet may be a booklet including a plurality of booklet bodies as long as the booklet is provided with at least the sheet-like first saddle-stitch substrate 11 including the optical functional unit 31 and the second saddle-stitch substrate 12 that adjoins the first saddle-stitch substrate 11 and includes the latent image 32.

Figure 3A:
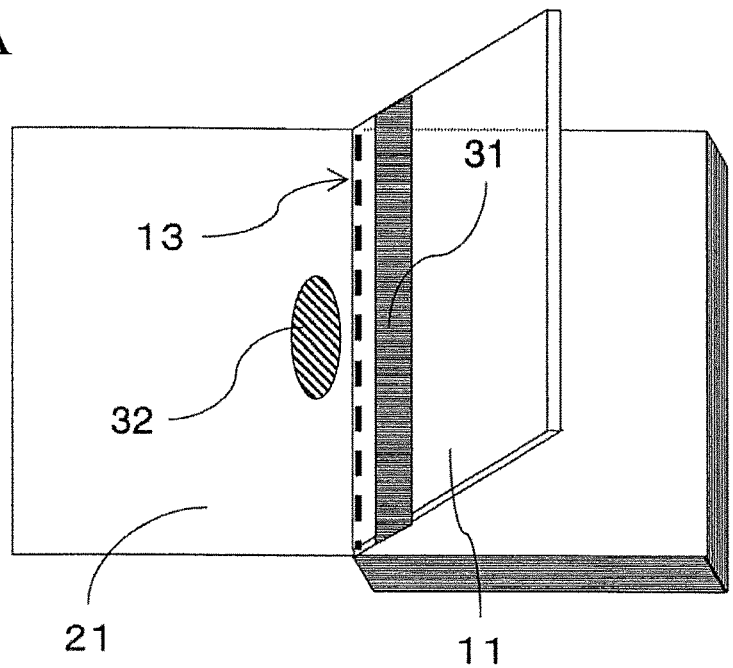
FIG. 3A is a schematic diagram illustrating a booklet related to another embodiment of the present invention.
Figure 3B:
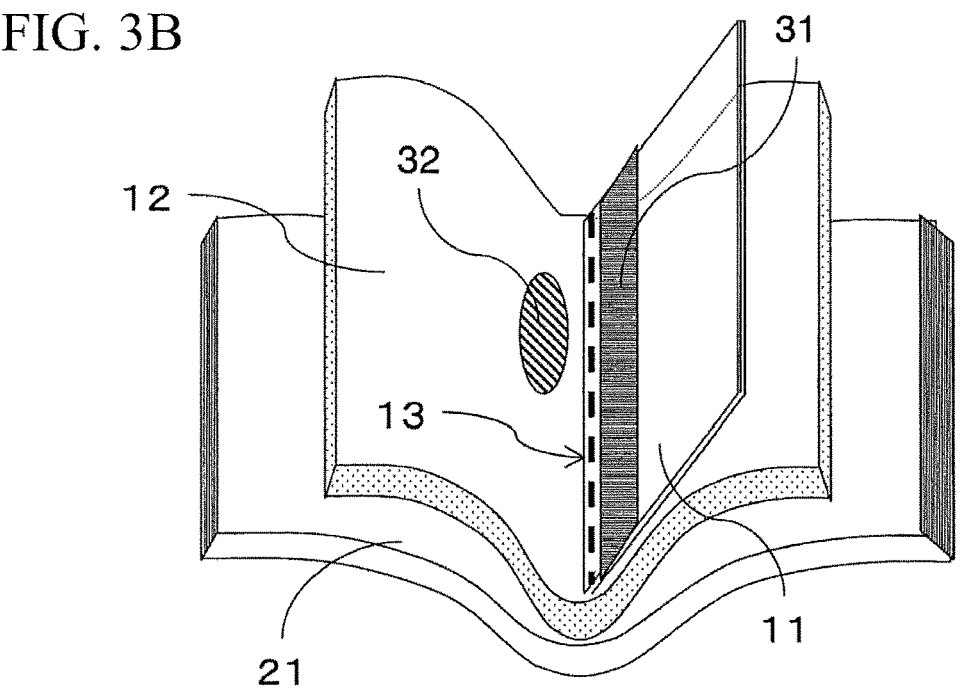
FIG. 3B is a schematic diagram illustrating a booklet related to still another embodiment of the present invention.

As shown in FIGS. 3A and 3B, the booklet may be a booklet in which the sheet-like saddle-stitch substrate 11 including the optical functional unit 31 is attached (here, saddle-stitched) to two facing pages of a second booklet body 21 on a side at which the latent image 32 is provided. For example, in a configuration shown in FIG. 3A, the first saddle-stitch substrate 11 that has a sheet shape and includes the optical functional unit 31 is saddle-stitched to the two facing pages of the second booklet body 21 on a side at which the latent image 32 is provided, and two left and right facing pages, which are adjacent to the first saddle-stitch substrate 11, of the second booklet body 21 correspond to the second saddle-stitch substrate. In a configuration shown in FIG. 3B, the first saddle-stitch substrate 11 including the optical functional unit 31 and the second saddle-stitch substrate 12 including the latent image 32 are saddle-stitched to the second booklet body 21.

In addition, in FIG. 1, the booklet 100 in which a light-transmitting film is used as the first saddle-stitch substrate 11 is shown. In FIG. 1, since the first saddle-stitch substrate 11 has a light-transmitting property, the binding member 13 and the inlet 14, which are inserted in the first saddle-stitch substrate 11, are drawn to be visible. This is true of FIGS. 3A and 3B.

In the following description, a booklet, which is configured by one saddle-stitched booklet body, will be described as an example. However, it is not limited thereto, and the configuration of the above-described booklet is applicable to each embodiment.

In each embodiment related to the present invention, the first saddle-stitch substrate 11 is saddle-stitched using binding means. As the binding means, general binding members such as a saddle-stitching thread and staples for a stapler may be used.

In addition, as the binding means, binding means including anti-counterfeiting means may be used. Specific examples thereof include a binding thread containing a material that emits fluorescence when being irradiated with ultraviolet lights and verification is realized by irradiation of an ultraviolet light source, and a thread on which micro characters are printed and the verification is realized by visual recognition in an enlargement manner.

In this configuration, the above-described anti-counterfeiting-treated materials may be used before binding into a booklet shape, or the anti-counterfeiting treatment may be performed after the binding as described in Japanese Unexamined Patent Application, First Publication No. 2001-232978. Alternately, binding means, which uses a binding method in which rebinding is difficult after binding once and disassembling this binding, may be used.

Examples of the saddle-stitching method using the binding thread include a method in which saddle-stitching is performed with a general stitching method by using an industrial sewing machine. A chain method in which binding is performed up to an edge of a substrate, or an interlock method in which the stitching stops midway through the substrate without performing the stitching up to the edge of the substrate may be adopted. It is more difficult for fraying of the binding thread to occur in the interlock method compared to the chain method. However, in the chain method, since an end of the binding thread is fixed by fusion with an adhesive layer or the first saddle-stitch substrate, adopting of the chain method is not problematic.

In addition, when an adhesive layer is formed on the first saddle-stitch substrate before performing the saddle-stitching, this adhesive layer functions as a substrate protective layer that suppresses breakage of the saddle-stitch substrate.

As described above, in a case where the anti-counterfeiting means performs authenticity determination on the basis of visual information, it is preferable that the binding portion 11a have a light-transmitting property in order for the binding portion 11a (in FIG. 1, a region overlapping the binding member 13) of the first saddle-stitch substrate 11 to be visually recognized.

Configuration examples of the first saddle-stitch substrate provided with the optical functional unit 31 that allows a latent image to be manifested and performs visual verification are shown in FIGS. 4A to 4D.

Figure 4A:
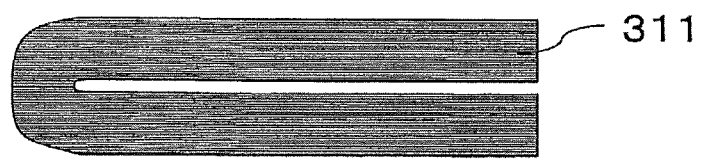
FIG. 4A is a schematic diagram illustrating a configuration example of an optical functional unit related to the embodiment of the present invention.

In a configuration shown in FIG. 4A, the entirety of the first saddle-stitch substrate 11 is configured by an optical functional film 311 having an optical function of allowing the latent image to be manifested. According to this configuration, it is not necessary to provide a separate optical function unit, and an optical function for visual verification may be realized by only the first saddle-stitch substrate 11.

Figure 4B:
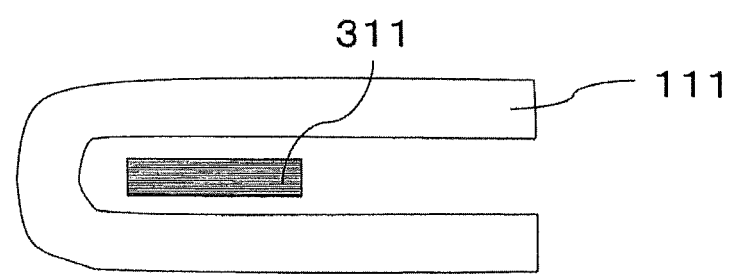
FIG. 4B is a schematic diagram illustrating a configuration example of an optical functional unit related to another embodiment of the present invention.
Figure 5:
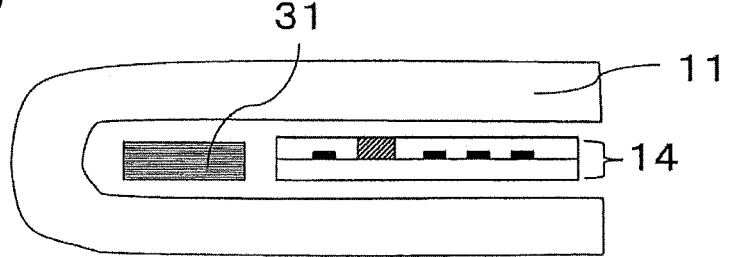
FIG. 5 is a schematic diagram illustrating a booklet related to still another embodiment of the present invention.

In a configuration example shown in FIG. 4B, an optical functional film 311 is interposed with a light-transmitting film 111 making up the first saddle-stitch substrate 11. According to this configuration, a region of the optical functional film 311 may be arbitrarily set. In addition, in a case where an inlet 14 of a non-contact IC is provided as shown in FIG. 5, the optical functional unit 31 may be provided in the same process as the interposing of the optical functional film 311.

Figure 4C:
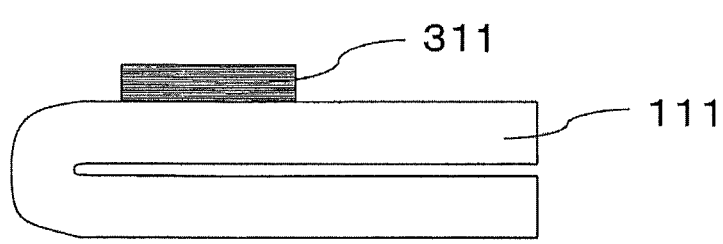
FIG. 4C is a schematic diagram illustrating a configuration example of an optical functional unit related to still another embodiment of the present invention.

In a configuration shown in FIG. 4C, the optical functional film 311 is provided on an external side of the light-transmitting film 111. In this configuration, when the latent image is provided on a sheet on a side that is opposite to the optical functional film 311, the light-transmitting film 111 is not interposed between the latent image and the optical functional film 311. Therefore, even when the light-transmitting film 111 is a material having an optical anisotropy, the visual recognition of the latent image is not affected by this material. As a result, even in a case where a general stretched film is used as the light-transmitting film 111, visibility of the latent image is high.

Figure 4D:
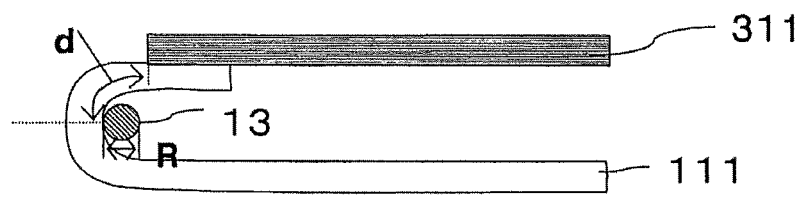
FIG. 4D is a schematic diagram illustrating a configuration example of an optical function unit related to still another embodiment of the present invention.

In a configuration shown in FIG. 4D, the optical functional film 311 is attached to an end portion of the light-transmitting film 111 in such a manner that the light-transmitting film 111 and the optical functional film 311 are opposite to each other. As described above, when a part of the first saddle-stitch substrate 11 is configured as an optical functional unit, the light-transmitting film 111 may not be laminated on the optical functional film 311 at least at a latent image verification region of the first saddle-stitch substrate 11. According to this configuration, since the light-transmitting film 111 is not interposed between the latent image and the optical functional unit 31, even when the light-transmitting film 111 is a material having an optical anisotropy, verification of the latent image is not affected by this material.

As the latent image 32, a polarization latent image may be used. In this case, the polarization latent image may be formed by a polarization layer having polarization directions that are different from each other in a background portion and a latent image portion. In addition, a phase difference layer in which phase differences are different from each other in the background portion and the latent image portion may be formed on the polarization layer in which a polarization direction is regular. The polarization latent image may be formed using a method in the related art. For example, an orientation layer may be provided in the latent image-forming region, and the latent image formed by an orientation pattern of the orientation layer. As the orientation layer, light orientation-curable liquid crystal or the like may be used. Alternately, the latent image may be formed as a phase difference pattern using cholesteric liquid crystal or the like. In the light orientation-curable liquid crystal layer, the latent image is formed by forming an orientation pattern. Alternately, a diffraction lattice may be provided in the light orientation-curable liquid crystal layer so as to cause polarization or orientation to occur. Here, light orientation-curable liquid crystal is a light-curable liquid crystal having a light orientation property.

As the optical functional unit 31 that is a verification filter to develop the polarization latent image, a polarization filter (polarization film) may be used. In this case, since light beams that are incident from the background portion and the latent image portion have polarization directions that are different from each other, when the light beams are allowed to pass through a polarization filter, the light beam that is incident from any one of the background portion and the latent image portion is blocked and the light beam that is incident from the other transmits through the polarization filter. In this manner, when the light beams are allowed to pass through the polarization filter, since contrast occurs between the background portion and the latent image portion, the latent image may be recognized. As this polarization filter, a general resin polarization plate, or a wide grid polarizer in which one thousand or more strip patterns are formed for each 1 mm may be used. The number of strip patterns may be arbitrarily set depending on a frequency of light that is an object, but may be approximately 5,000 or 10,000 for each 1 mm as long as polarized light of a visible light band is selectively transmitted through the strip patterns. In addition, a λ/4 phase difference plate that realizes circular polarization, a band pass filter that controls a transmission wavelength, or the like may be provided to the optical functional unit 31.

Figure 6A:
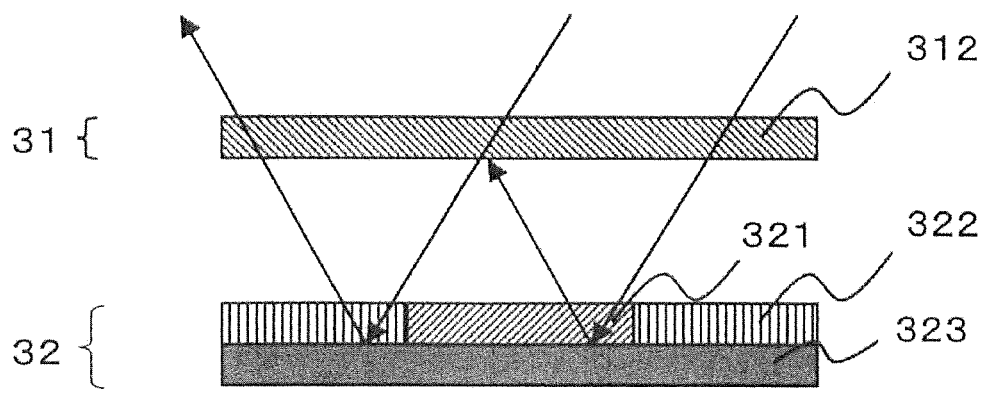
FIG. 6A is a schematic diagram illustrating a configuration example of the optical functional unit and a latent image related to the embodiment of the present invention.
Figure 6B:
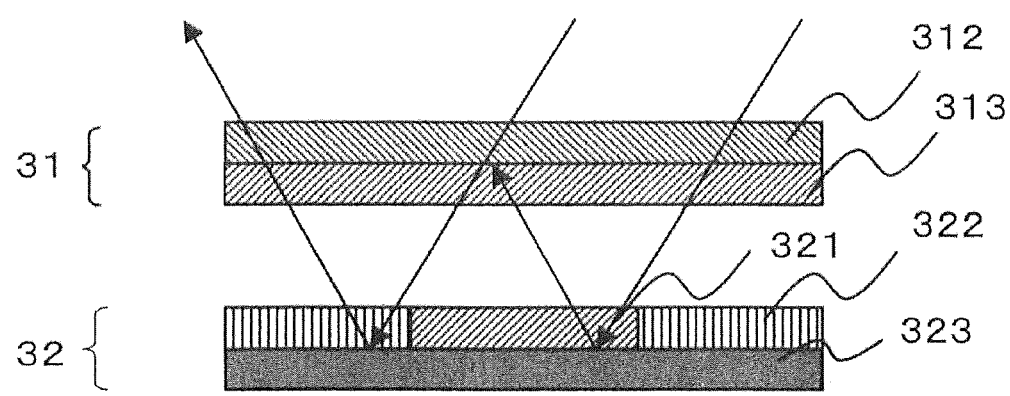
FIG. 6B is a schematic diagram illustrating another configuration example of the optical functional unit and the latent image related to the embodiment of the present invention.

FIGS. 6A and 6B show schematic diagrams illustrating configuration examples of the optical functional unit 31 and the latent image 32. In a configuration shown in FIG. 6A, the optical functional unit 31 is configured by a polarization layer 312. A configuration shown in FIG. 6B shows an example in which the optical functional unit 31 is configured by a laminated body of the polarization layer 312 and the phase difference layer 313.

The latent image 32 is configured by one or a plurality of orientation patterns on a reflective layer 323, and in FIGS. 6A and 6B, a first orientation pattern 321 and a second orientation pattern 322 in which orientation directions are different from each other are provided. In an example of FIG. 6B, since the phase difference layer 313 is provided to the optical functional unit 31, a phase difference pattern may be used instead of an orientation pattern.

As a material making up the light-transmitting film 111 that is used for the first saddle-stitch substrate 11, a general plastic film may be used. Examples of the general plastic film include polyester-based substrates such as polyethylene terephthalate (PET) and polyethylene naphthalate (PEN), polyimide substrates, acryl-based substrates, vinyl chloride-based substrates, and the like. In addition, a multi-layer structure film in which a functional layer for improvement of a printing property and adhesiveness or prevention of electrification is laminated may be used. In addition, a hard substrate using a high performance plastic such as polycarbonate may be used. Particularly, when a chromogenic resin material on which printing may be performed by laser irradiation is used as the first saddle-stitch substrate 11, printing of a unique ID or the like may be performed on the first saddle-stitch substrate 11. Examples of the chromogenic resin material include a resin obtained by adding an additive such as a foaming agent and a pigment to a resin such as polycarbonate and PET.

In regard to the "light-transmitting property" in this embodiment of the present invention, it is not necessary to have high transmissivity with respect to all light wavelengths of a visible light band, and may be colored. A transmittance of a degree at which at least a latent image manifested by the optical functional unit 31 is visually recognized may be provided with respect to a predetermined light wavelength. However, as described later, particularly, in a case of providing the latent image and the optical functional layer, it is preferable that the light transmittance be 90% or more at a wavelength band (approximately 400 to 800 nm) of visible light so as not to have an effect on expression of the latent image. In addition, in a case of performing verification by emitting ultraviolet lights to the binding member 13, a light-transmitting film that allows the ultraviolet lights to transmit therethrough is used. In this case, it is preferable that transmittance with respect to the emitted ultraviolet lights be 50% or more.

Figure 7A:
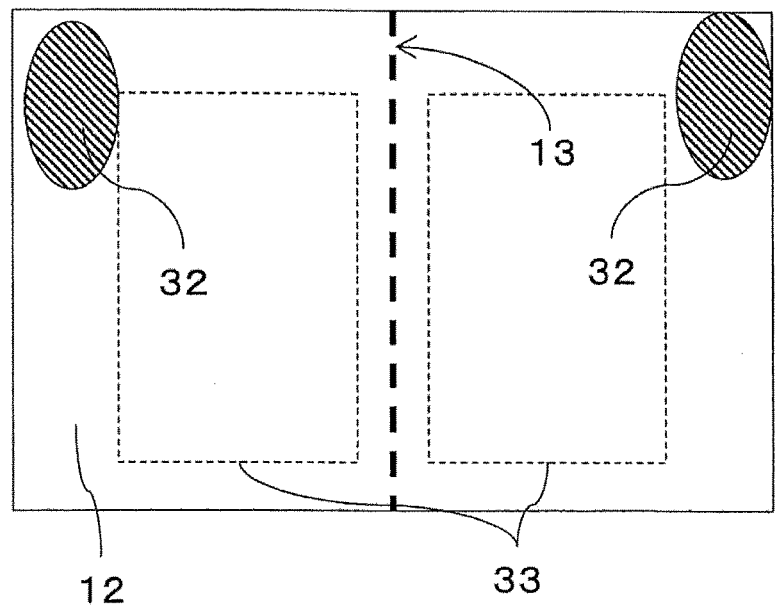
FIG. 7A is a schematic diagram illustrating a disposition of the latent image on a second saddle-stitch substrate related to the embodiment of the present invention.
Figure 7B:
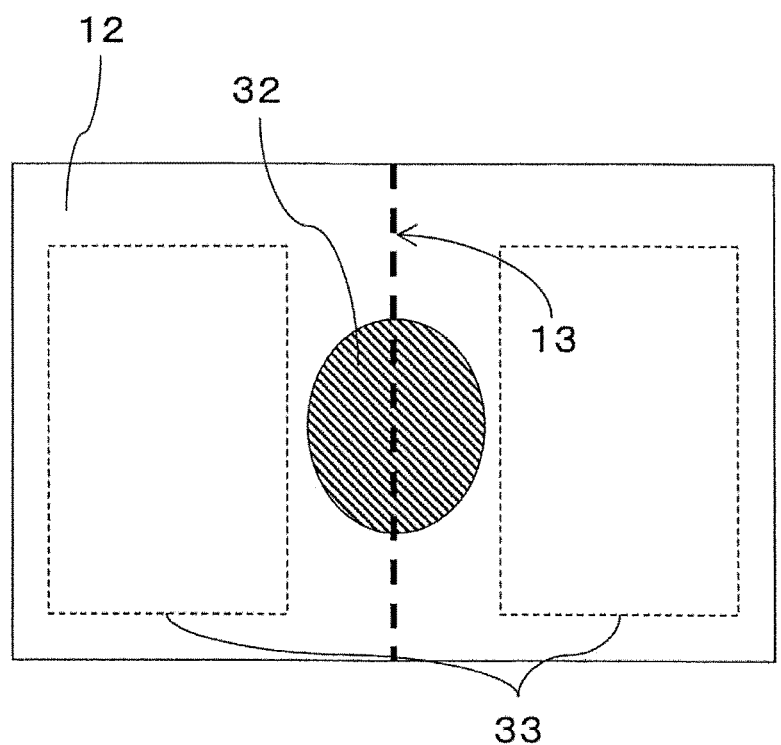
FIG. 7B is a schematic diagram illustrating another disposition of the latent image on the second saddle-stitch substrate related to the embodiment of the present invention.

FIGS. 7A and 7B show schematic diagrams illustrating disposition of the latent image 32 on the second saddle-stitch substrate 12 that adjoins pages formed from the first saddle-stitch substrate 11. Each region 33 surrounded by dotted lines on the second saddle-stitch substrate 12 represents a region corresponding to a position of the inlet 14 when each of the pages formed from the first saddle-stitch substrate 11 overlaps one side of two facing pages of the second saddle-stitch substrate. The latent image 32 may be formed on a one-side page of the two facing pages of the second saddle-stitch substrate 12, or may be formed on both sides. Particularly, as shown in FIG. 5, since the optical functional unit 31 is provided outside the region 33 corresponding to the inlet 14, as shown in FIG. 7A, the latent image 32 may be provided at a peripheral portion of the second saddle-stitch substrate 12. Alternatively, as shown in FIG. 7B, the latent image 32 may be provided at the center portion of the second saddle-stitch substrate 12. Particularly, as shown in FIG. 7B, in the case of providing the latent image 32 at the center portion of the second saddle-stitch substrate 12, the latent image 32 may be formed in a continuous manner across a folding line of half-folding. According to this configuration, an effect of the latent image 32 may be visually recognized in a clearer manner compared to a configuration in which the optical functional unit 31 overlaps one side of the latent image 32.

As the second saddle-stitch substrate 12, a substrate having a strength capable of being saddle-stitched by the binding member 13 may be appropriately adopted. As this substrate, various kinds of plastic films may be used. Examples of the plastic films include fibrous substrates such as general pulp paper and synthetic paper, polyester-based substrates such as polyethylene terephthalate (PET) and polyethylene naphthalate (PEN), polyimide substrates, acryl-based substrates, and vinyl chloride-based substrates. In addition, a hard substrate using a high performance plastic such as polycarbonate may be used. Particularly, when a chromogenic resin material on which printing may be performed by laser irradiation is used as the second saddle-stitch substrate 12, printing of a unique ID or the like may be performed on the second saddle-stitch substrate 12. Examples of the chromogenic resin material include a resin obtained by adding an additive such as a foaming agent or a pigment to a resin such as polycarbonate and PET.

The saddle-stitch substrate may be used for a substrate in which the same kind or plural kinds of materials overlap each other. For example, so as to improve strength, a material having the film thickness or rigidity larger than that of an inner side saddle-stitch substrate may be used for a rear side saddle-stitch substrate. In addition, as described above, a separate booklet body may be used as the second saddle-stitch substrate 12.

The inlet 14, which is interposed between two left and right facing pages of the first saddle-stitch substrate 11 that is saddle-stitched, includes at least the IC chip 141 and the antenna 142. This inlet 14 functions as an IC that is capable of writing in or reading out information to or from the IC chip in a noncontact manner.

Figure 8A:
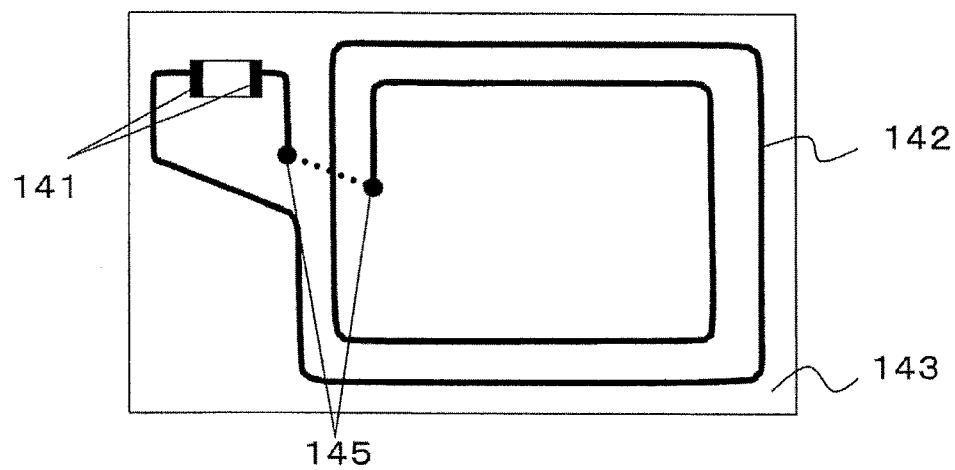
FIG. 8A is a schematic diagram illustrating a configuration example of an inlet related to the embodiment of the present invention.
Figure 8B:
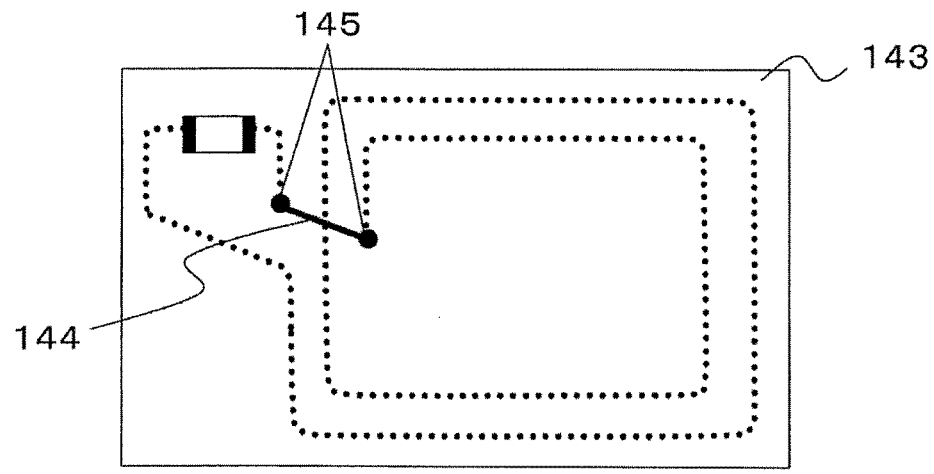
FIG. 8B is a schematic diagram illustrating a configuration example of the inlet related to the embodiment of the present invention.

FIGS. 8A and 8B show schematic diagrams illustrating a configuration example of the inlet 14. FIG. 8A illustrates an antenna pattern-forming surface (a first surface), and FIG. 8B illustrates a rear surface thereof (a second surface). In the example shown in FIGS. 8A and 8B, an antenna 142 is formed on an inlet substrate 143, and a jumper line 144 is provided on a rear surface at an intersection portion of the pattern to connect connection portions 145 at both ends of an antenna 142, thereby forming the antenna.

As the inlet substrate 143, a polyester film substrate such as polyethylene terephthalate (PET), polyimide substrate, an acryl-based substrate, a vinyl chloride-based substrate, or the like may be used. In addition, a hard substrate using a high performance plastic such as polycarbonate may be used. Particularly, when a chromogenic resin material on which printing may be performed by laser irradiation is used as the inlet substrate 143, printing of a unique ID or the like may be performed on the inlet substrate 143. Examples of the chromogenic resin material include a resin obtained by adding an additive such as a foaming agent or pigment to a resin such as polycarbonate and PET.

In addition, a paper substrate may be used as the inlet substrate 143. Although not particularly limited, for example, a hard paper substrate using compressed and adhered paper may be used as the paper substrate. Specifically, a hard paper substrate, which is obtained by laminating a plurality of vulcanized fibers of which a raw material is natural cellulose, or the like may be exemplified.

The pattern of the antenna 142 may be formed by an etching method, a plating method, a printing method, or a pattern deposition method.

In the etching method, metallic foil of aluminum, copper, or the like is adhered to an antenna substrate, or a thin metallic film of aluminum, copper, or the like is formed on the antenna substrate by a deposition method, a sputtering method, or the like, and then a mask pattern is formed on the thin metallic film, and then an antenna-shaped pattern may be obtained by etching the thin metallic film.

In the printing method, a conductive ink is printed. The printing method is not particularly limited as long as minute printing is possible, but as the printing method, a screen printing method may be appropriately used. In a case of using a paper substrate as the antenna substrate, a printing method may be appropriately used as an antenna-forming method.

In the plating method, a catalyst layer is patterned, and then the antenna is formed by electroplating or electroless plating.

In the pattern deposition method, an antenna pattern is formed by carrying out a deposition method, sputtering, or the like into a pattern shape by using a mask having an opening. Instead of providing the jumper line on the rear surface, an interconnection including an insulating substrate and a conductive member may be adhered to an interconnection portion of the antenna pattern and both ends of the interconnection may be electrically connected to the antenna.

In addition, as another antenna-forming method, the antenna may be formed by fixing and disposing a metallic wire in a coil shape. A winding number, a shape, or the like of the antenna may be appropriately set in correspondence with a communication frequency and other characteristics. Particularly, this configuration may be used in a case of forming the antenna and the interconnection on one surface.

The IC chip 141 and the antenna 142 may be connected by adhering a bump or a connection pad, which is connected to an end of the antenna 142 and the IC chip 141, with welding or an adhesive. As the adhesive, a conductive adhesive may be appropriately used.

Figure 9:
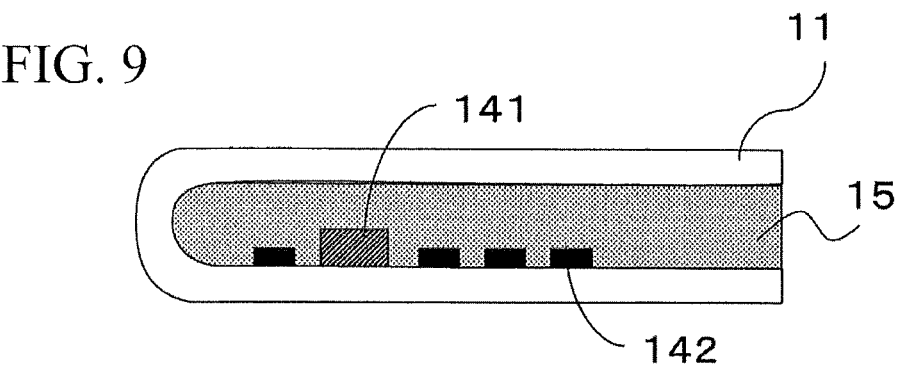
FIG. 9 is a schematic diagram illustrating a configuration example of the inlet related to the embodiment of the present invention.

In addition, as shown in a configuration example shown in FIG. 9, the inlet 14 may be directly formed on the first saddle-stitch substrate (light-transmitting film) 11 without providing the inlet substrate 143. In FIG. 9, a schematic cross-sectional diagram of the inlet 14 and the first saddle-stitch substrate 11 is shown, and the other portions are omitted. In addition, a protective layer may be provided so as to protect the IC chip 141 or so as to eliminate a film thickness difference between IC chip 141 forming-portion, the antenna 142, and an antenna-forming surface. For example, a protective layer having a sealing function or a protective layer in which an opening is provided in a region corresponding to the IC chip may be laminated on the antenna-forming surface before or after mounting the IC chip.

A shielding layer that covers at least a part of the inlet 14 may be provided so as not to expose the IC chip 141. In this case, from a viewpoint of security, the shielding layer is preferably provided so as to hide the IC chip 141.

Configuration examples of the shielding layer are shown in FIGS. 10A to 10D. In FIGS. 10A to 10D, a schematic cross-sectional diagram of the inlet 14 and the first saddle-stitch substrate 11 are shown, and the other portions are omitted.

Figure 10A:
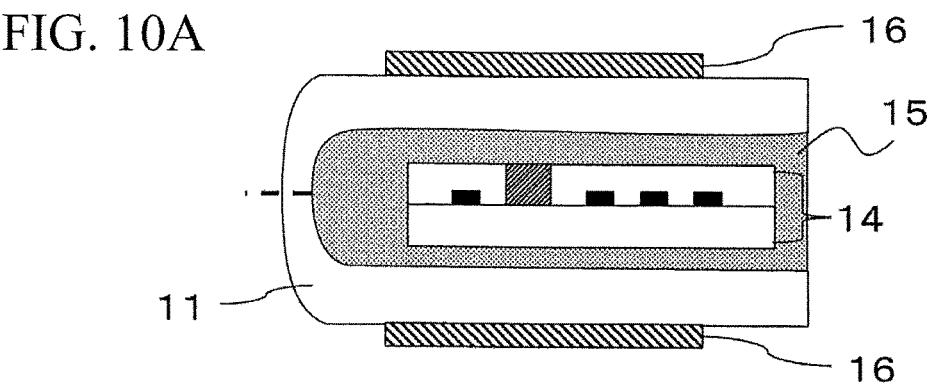
FIG. 10A is a schematic diagram illustrating a configuration example of an IC-attached booklet related to an embodiment of the present invention in which a shielding layer is provided.
Figure 10B:
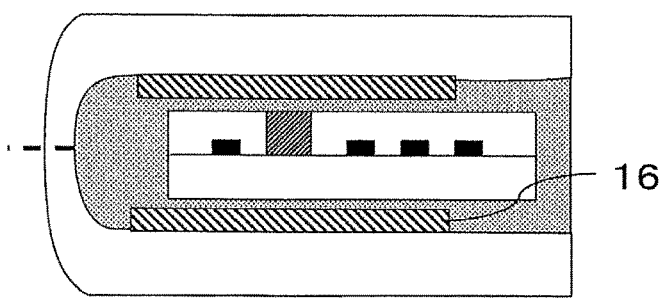
FIG. 10B is a schematic diagram illustrating a configuration example of an IC-attached booklet related to another embodiment of the present invention in which the shielding layer is provided.
Figure 10C:
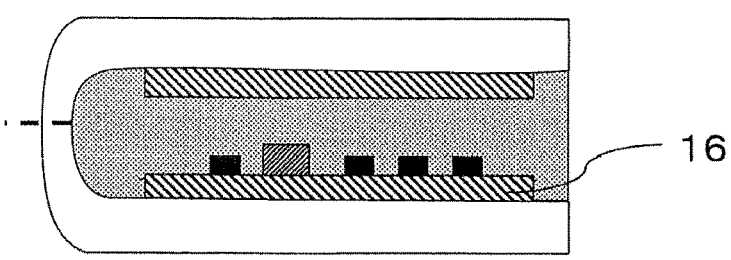
FIG. 10C is a schematic diagram illustrating a configuration example of an IC-attached booklet related to still another embodiment of the present invention in which the shielding layer is provided.

In FIG. 10A, a shielding layer 16 is provided on an exposed surface (external side) of the first saddle-stitch substrate (light-transmitting film) 11. In FIG. 10B, the shielding layer 16 is provided on an inner side of the first saddle-stitch substrate (light-transmitting film) 11. In FIG. 10C, the shielding layer 16 is provided on an inner side of the first saddle-stitch substrate (light-transmitting film) 11 and the IC chip 141 and the antenna 142 (inlet) are formed on the shielding layer 16.

In FIGS. 10A to 10C, since the shielding layer 16 is provided to the first saddle-stitch substrate (transparent film) 11, the first saddle-stitch substrate (light-transmitting film) 11 to which the shielding layer 16 is provided in advance before the saddle-stitching may be used. In addition, in a case where the authenticity determination is performed by the anti-counterfeiting means of the above-described binding member 13, so as to visually recognize the binding member 13 through the first saddle-stitch substrate (light-transmitting film) 11 in a reliable manner in any configuration, it is preferable that the inlet 14 and the shielding layer 16 be disposed on the first saddle-stitch substrate (light-transmitting film) 11 to be spaced from the binding member 13 by a distance of at least 0.5 mm from a folding line (center line) of half-folding, and more preferably 1 mm or more.

Figure 10D:
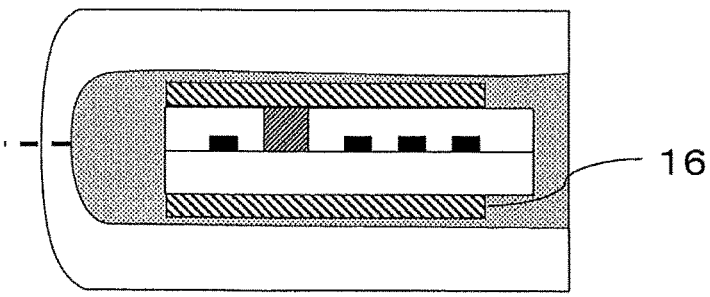
FIG. 10D is a schematic diagram illustrating a configuration example of an IC-attached booklet related to still another embodiment of the present invention in which the shielding layer is provided.
Figure 11:
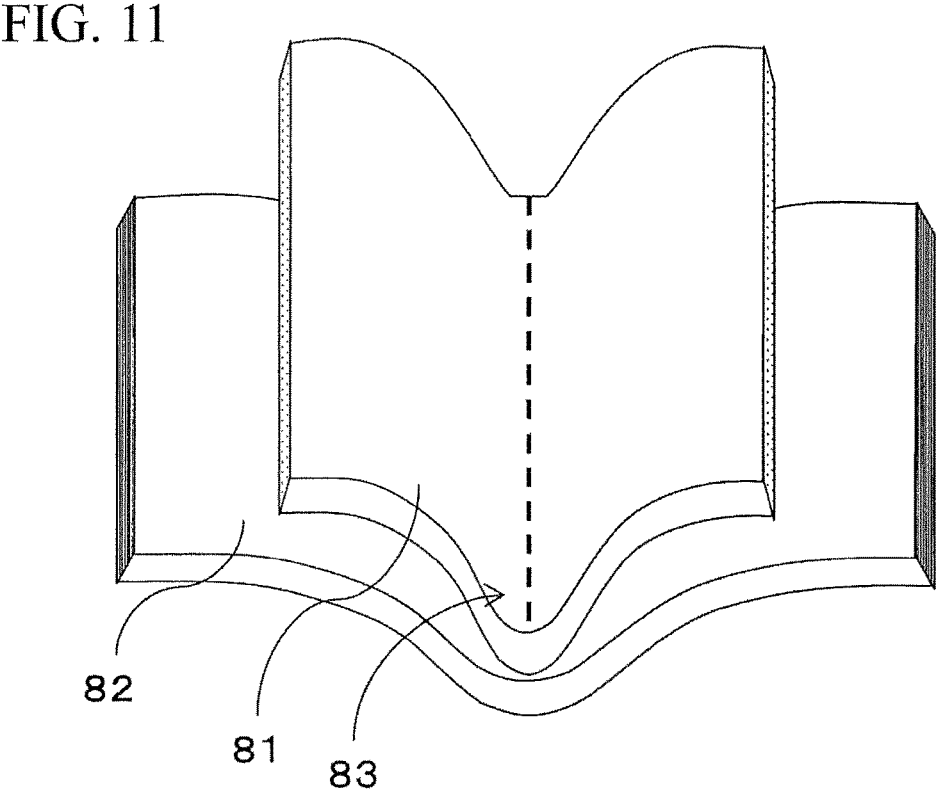
FIG. 11 is a schematic diagram illustrating one type of a booklet in the related art.

In FIG. 10D, since the shielding layer 16 is provided to the inlet 14, when the first saddle-stitch substrate 11 is formed from a light-transmitting film, the anti-counterfeiting means of the binding member 13 may be used. In addition, the disposition of the shielding layer 16 shown in FIGS. 10A to 10D may be used in combination.

As the shielding layer 16, a light-shielding pattern such as a character and a design may be directly provided to the first saddle-stitch substrate 11 or the inlet 14. Alternately, the above-described pattern may be provided to another substrate to form the shielding layer 16, and this shielding layer 16 may be adhered to the first saddle-stitch substrate 11 or the inlet 14. The above-described pattern may be formed by a printing method using, for example, a white or black color pigment or ink containing a dye.

Next, after at least the inlet 14 or the optical functional film 311 is disposed between the two left and right facing pages of the sheet-like first saddle-stitch substrate 11, the two left and right facing pages of the first saddle-stitch substrate 11 are adhered to each other, whereby the booklet related to this embodiment is manufactured.

In regard to a disposition method, the first saddle-stitch substrate 11 may be adhered after fixing at least the inlet 14 or the optical functional film 311 to one side page of the two facing pages. Alternately, at least the inlet 14 or the optical functional film 311 may be inserted at the same time with the adherence of the first saddle-stitch substrate 11.

As an adhesive that is used for the adhesive layer 15 that adheres the first saddle-stitch substrate 11, for example, adhesives in the related art such as an EVA (ethylene vinyl acetate resin)-based adhesive, an EAA (ethylene acrylate copolymer resin)-based adhesive, a polyester-based resin, and a polyurethane-based adhesive may be used. Instead of applying an adhesive, an adhesive sheet formed from a resin that is used in the above-described adhesive may be used in a state of being interposed in the first saddle-stitch substrate (light-transmitting film) 11. In addition, a first saddle-stitch substrate (light-transmitting film) 11 in which an adhesive layer is formed on an adhesion surface in advance may be used. Particularly, when using a hot melt adhesive, adhesion may be easily performed by thermal compression bonding, and thus flatness of the first saddle-stitch substrate 11 after the adhesion may be maintained.

Furthermore, in a case where a thermoplastic substrate is used as the first saddle-stitch substrate 11, the adhesion may be carried out by thermal compression bonding without using the above-described adhesive layer 15. When carrying out the adhesion by the thermal compression bonding, since the inlet 14 and the first saddle-stitch substrate 11 are integrated, for example, counterfeiting by substitution of the IC chip 141 becomes more difficult.

Particularly, in a case where polycarbonate is used as the first saddle-stitch substrate 11 and chromogenic polycarbonate on which symbols, characters, or the like are printed is used as the inlet substrate 143, when these first saddle-stitch substrate 11 and the inlet 14 are integrated by the thermal compression bonding, counterfeiting of the printed symbols, characters, or the like becomes difficult. Therefore, security of the booklet 100 may be increased.

In addition, the printing to the inlet 14 may be carried out before the integration. The printing to the inlet 14 may be carried out after the adhesion of the saddle-stitch substrate 11 by utilizing transparency of the saddle-stitch substrate 11.

In addition, in the above-described embodiments that are shown, the latent image 32 is provided at the left page of the second saddle-stitch substrate 12 that adjoins the first saddle-stitch substrate 11 and is saddle-stitched thereto. However, there is no limitation thereto, and the latent image 32 may be provided to the right page of the second saddle-stitch substrate 12 that adjoins the first saddle-stitch substrate 11 and is saddle-stitched thereto. That is, the latent image 32 may be provided at a position that is opposite to the optical functional layer of the saddle-stitch substrate that adjoins the first saddle-stitch substrate 11 and is saddle-stitched thereto.

According to the booklet related to the embodiments of the present invention, since the optical functional unit 31 is provided to the first saddle-stitch substrate 11, and the latent image, which may be manifested by allowing the optical functional layer to be operated, is provided to the second saddle-stitch substrate 12 that adjoins the first saddle-stitch substrate 11 and is saddle-stitched thereto at a position opposite to the optical functional layer, a booklet provided with anti-counterfeiting means that is capable of easily performing self-verification may be formed. Therefore, a booklet that is easily manufactured and has high security may be formed.

Although a few embodiments have been shown and described, it would be appreciated by those skilled in the art that changes may be made in these embodiments without departing from the principles and spirit of the invention, the scope of which is defined in the claims and their equivalents.

What is claimed is:
1. A booklet comprising:
a first sheet substrate comprising a light-transmitting film having a light transmittance of 90% or more at a wavelength band of visible light, the first sheet substrate folded in half along a folding line defining two portions that are adhered to each other;
an optical functional unit provided to the light-transmitting film and having a polarization function;
a second sheet substrate saddle-stitched under the first sheet substrate;
a binding member stitched into the first sheet substrate at the folding line, comprising an anti-counterfeiting member, and saddle-stitching together the first sheet substrate and the second sheet substrate;

a latent image provided to a surface of the second sheet substrate that is opposite to the first sheet substrate at a position corresponding to the optical functional unit, provided at a central portion of the second sheet substrate, and formed in the second sheet substrate in a continuous manner across the folding line where the second sheet substrate is attached to the first sheet substrate, the latent image manifesting when the optical functional unit operates by overlapping the first sheet substrate with the second sheet substrate;

an inlet comprising at least an IC chip and an antenna interposed between the two portions of the first sheet substrate adhered to each other; and a shielding layer covering at least a part of the inlet and provided so as not to expose the IC chip, the inlet and the shielding layer spaced from the binding member by a distance of at least 0.5 mm or more from the folding line.

2. The booklet according to claim 1, wherein the first sheet substrate and a substrate of the inlet each comprise thermoplastics.

3. The booklet according to claim 1, wherein the optical functional unit comprises a polarization film that is interposed between the two portions of the first sheet substrate adhered to each other.

4. The booklet according to claim 1, wherein at least a part of the first sheet substrate is configured as a polarization film.

5. A method of manufacturing a booklet, the booklet including a first sheet substrate comprising a light-transmitting film having a light transmittance of 90% or more at a wavelength band of visible light, an optical functional unit provided to the light-transmitting film, a second sheet substrate saddle-stitched under the first sheet substrate, a binding member comprising an anti-counterfeiting member and stitching the first sheet substrate and the second sheet substrate, and a latent image provided to a surface of the second sheet substrate that is opposite to the first sheet substrate at a position corresponding to the optical functional unit, provided at a central portion of the second sheet substrate, and formed in the second sheet substrate in a continuous manner across a folding line where the second sheet substrate is attached to the first sheet substrate, the latent image manifesting when the optical functional unit operates by overlapping the first sheet substrate with the second sheet substrate, the method comprising:

saddle-stitching a first sheet substrate, which comprises a light-transmitting film and is provided with an optical functional unit, having a polarization function, at the light-transmitting film, onto a second sheet substrate using a binding member, the binding member stitched into the first sheet substrate at the folding line of the first sheet substrate defining two portions of the first sheet substrate, and the second sheet substrate provided with a latent image, which is manifested by allowing the optical functional unit to operate, on a surface of the second sheet substrate that is opposite to the first sheet substrate at a position corresponding to the optical functional unit;

folding the first sheet substrate in half along the folding line defining the two portions, and adhering the two portions to each other;

interposing the optical functional unit or an inlet comprising at least an IC chip and an antenna between the two portions of the first sheet substrate;

forming a shielding layer that covers at least a part of the inlet so as not to expose the IC chip; and disposing the inlet and the shielding layer so as to be spaced from the binding member by a distance of at least 0.5 mm or more from the folding line.

6. A method of manufacturing a booklet, the method comprising:

saddle-stitching a first sheet substrate, which comprises a light-transmitting film having a light transmittance of 90% or more at a wavelength band of visible light and is provided with an optical functional unit, having a polarization function, at the light-transmitting film, on to a second sheet substrate using a binding member, the binding member stitched into the first sheet substrate at a folding line of the first sheet substrate defining two portions of the first sheet substrate, the second sheet substrate provided with a latent image, which is provided at a central portion of the second sheet substrate, is formed in the second sheet substrate in a continuous manner across the folding line where the second sheet substrate is attached to the first sheet substrate, and is manifested by allowing the optical functional unit to operate, the latent image being on a surface of the second sheet substrate that is opposite to the first sheet substrate at a position corresponding to the optical functional unit;

folding the first sheet substrate in half along the folding line defining the two portions, and adhering the two portions to each other;

interposing the optical functional unit or an inlet comprising at least an IC chip and an antenna between the two portions of the first sheet substrate;

forming a shielding layer that covers at least a part of the inlet so as not to expose the IC chip; and disposing the inlet and the shielding layer so as to be spaced from a binding member comprising an anti-counterfeiting member by a distance of at least 0.5 mm or more from the folding line.

* * * * *